US011873678B2

(12) United States Patent
Hoezee

(10) Patent No.: US 11,873,678 B2
(45) Date of Patent: Jan. 16, 2024

(54) MAGNETIC SMART SEAL FOR OVERHEAD GARAGE DOOR

(71) Applicant: Andrew S. Hoezee, Hudsonville, MI (US)

(72) Inventor: Andrew S. Hoezee, Hudsonville, MI (US)

( * ) Notice: Subject to any disclaimer, the term of this patent is extended or adjusted under 35 U.S.C. 154(b) by 0 days.

(21) Appl. No.: 17/518,217

(22) Filed: Nov. 3, 2021

(65) Prior Publication Data

US 2022/0136321 A1 May 5, 2022

Related U.S. Application Data

(60) Provisional application No. 63/109,107, filed on Nov. 3, 2020.

(51) Int. Cl.
*E06B 7/23* (2006.01)
*E06B 3/70* (2006.01)

(52) U.S. Cl.
CPC .............. *E06B 7/2312* (2013.01); *E06B 3/70* (2013.01); *E06B 2003/7044* (2013.01)

(58) Field of Classification Search
CPC .... E06B 7/20; E06B 2007/202; E06B 7/2312; E06B 7/70; E06B 2003/7044
USPC ........................................................ 49/478.1
See application file for complete search history.

(56) References Cited

U.S. PATENT DOCUMENTS

| | | | | | |
|---|---|---|---|---|---|
| RE23,636 | E * | 3/1953 | Mark et al. | F25D 23/087 | 49/478.1 |
| 2,749,582 | A * | 6/1956 | Beck | E06B 7/20 | 160/40 |
| 3,331,158 | A * | 7/1967 | Frakes | E06B 7/20 | 160/40 |
| 3,695,332 | A * | 10/1972 | Bahnsen | E05F 15/686 | 292/225 |
| 4,880,046 | A * | 11/1989 | Gesy | E05F 15/668 | 160/40 |
| 4,922,168 | A * | 5/1990 | Waggamon | E05F 15/43 | 318/275 |
| 5,039,826 | A * | 8/1991 | Newland | E05D 11/0081 | 49/478.1 |
| 5,954,111 | A * | 9/1999 | Ochoa | E05D 15/24 | 16/96 R |
| 8,881,464 | B1 * | 11/2014 | Huckeba | E06B 1/6046 | 49/489.1 |

(Continued)

FOREIGN PATENT DOCUMENTS

DE 20 2021 001 951 * 8/2021

*Primary Examiner* — Gregory J Strimbu
(74) *Attorney, Agent, or Firm* — Bodman PLC

(57) ABSTRACT

A garage door has panels pivotally interconnected and spanning horizontally across a door opening defined by a door frame. The panels have rollers that are movably engaged with tracks extending along lateral sides of the door frame. A motorized opener is coupled with the garage door and is configured to move the garage door along the tracks between an open position and a closed position. The motorized opener has a controller for controlling movement of the garage door. Electro-permanent magnets are disposed adjacent the lateral sides of the door frame. The magnets are configured to magnetically engage the garage door in the closed position and to release the magnetic engagement with the garage door in response to a signal from the controller.

20 Claims, 8 Drawing Sheets

(56) References Cited

U.S. PATENT DOCUMENTS

| | | | | |
|---|---|---|---|---|
| 9,097,062 | B2 * | 8/2015 | Letonje | E06B 9/15 |
| 9,963,921 | B1 * | 5/2018 | Kamkar | G07C 9/00174 |
| 10,563,453 | B2 | 2/2020 | Steinke | |
| 2010/0018093 | A1 * | 1/2010 | O'Sullivan | G09F 7/04<br>40/600 |
| 2017/0183897 | A1 | 6/2017 | Bruckelmyer et al. | |
| 2019/0186181 | A1 * | 6/2019 | Robertson | H01F 7/1646 |
| 2019/0261620 | A1 | 8/2019 | Koshar | |

* cited by examiner

MAGNETIC SMART SEAL FOR OVERHEAD GARAGE DOOR

CROSS-REFERENCE TO RELATED APPLICATION

This application claims priority under 35 U.S.C. § 119(e) to U.S. Provisional Patent Application No. 63/109,107, filed Nov. 3, 2020, the disclosure of this prior application is considered part of this application and is hereby incorporated by reference in its entirety.

TECHNICAL FIELD

The present disclosure relates to seals and closure mechanisms for doors, such as overhead garage doors, to reduce air, water, and heat transfer when the door is closed.

BACKGROUND

Large enclosed structures, such as sheds, barns, and garages, often include large doors, such as an overhead garage door, to allow access to vehicles and other large equipment. In addition to vehicle and equipment storage, the interiors of garages and other large enclosed structures may be used for multiple or alternative purposes, such as a workshop area, a sporting or exercise area, and/or a home office area. Accordingly, it can be desirable to control the interior temperature of garages with heating and/or cooling. To prevent heat loss when the garage door is closed, garage doors may include insulation panels. Also, garage doors openings are often trimmed with a seal that is designed to contact the edges of the door in a closed position, which can function to prevent heat loss and reduce insect and animal access openings around the closed door.

SUMMARY

The present disclosure provides a system and a magnetic seal for a door that seals edges of the door against the door frame in the closed position. To provide the magnetic seal, an electromagnet, such as an electo-permanent magnet, is disposed at the edges of the door frame in a position to engage the corresponding edges of the door in the closed position. The door may be a jointed panel door, such as an overhead garage door, that moves along tracks installed at the interior of the door frame. When the door is in the closed position, the magnet is magnetically attracted to the edge of the door, which draws the door into sealed engagement with the door frame. To move the door to the open position, the magnet is configured to disengage the edge of the door frame and thereby release the seal, such as by reversing or eliminating the magnetic field that is attracted to the door in the closed position.

According to one aspect of the present disclosure, a system provides a garage door that has panels pivotally interconnected and spanning horizontally across a door opening defined by a door frame. The panels have rollers that are movably engaged with tracks extending along lateral sides of the door frame. A motorized opener is coupled with the garage door and is configured to move the garage door along the tracks between an open position and a closed position in the garage door opening. The motorized opener has a controller for controlling movement of the garage door. A magnet is disposed at opposing lateral sides of the door frame. The magnets are configured to magnetically engage the garage door in the closed position and to release magnetic engagement with the garage door in response to a signal from the controller for the garage door to move to the open position.

Implementations of the disclosure may include one or more of the following optional features. In some implementations, the magnets are electro-permanent magnets. The electro-permanent magnets can switch between an ON state and an OFF state in response to a pulse of electrical current. For example, the signal from the controller of the motorized opener may generate the pulse of electrical current to switch the electro-permanent magnets to the OFF state. The electro-permanent magnets generate a magnetic field in the ON state that is configured to magnetically engage the garage door in the closed position and form a seal between the garage door and the door frame.

In some implementations, a sensor disposed at a lower portion of one of the lateral sides of the door frame, where the sensor communicates with the controller of the motorized opener over a wire. The controller may transmit a pulse of electrical current over the wire to the magnets to release the magnetic engagement with the garage door.

In some examples, a weatherstrip is disposed at the magnet and extends along the opposing lateral sides of the door frame. With garage door in the closed position and the magnet magnetically engaged with the garage door, the weatherstrip contacts the garage door to form a seal. In some implementations, a trim piece is provided that has a channel along the trim piece, where the magnet is disposed in the channel. The trim piece may vertically attach to the door frame, such as to conceal the opposing lateral edges of the panels of the garage door.

In some implementations, the panels of the garage door are formed from a ferromagenetic metal, such as stamped steel. In other examples where the panels are not formed from a ferromagnetic metal, such as wood or fiberglass, a metal strip is attached at opposing lateral edges of the panels of the garage door.

In some examples, the tracks have an interior width that is greater than a diameter of the rollers to allow the rollers to move in the interior width of the track with the door in the closed position, such as in response to the engagement and disengagement of the magnets with the door.

According to another aspect of the present disclosure, a magnetic smart seal for an overhead garage door includes a trim piece that has a channel along the trim piece, such as to provide a body of the trim piece with a U-shape. The body of the trim piece has a flange that is configured to attach to a frame surrounding a garage door opening. A seal extends from a portion of the body of the trim piece that opposes the flange. The seal is configured to contact a garage door closed in the door opening. An electro-permanent magnet is disposed in the channel and is configured to magnetically engage the garage door.

The details of one or more implementations of the disclosure are set forth in the accompanying drawings and the description below. Other aspects, features, and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
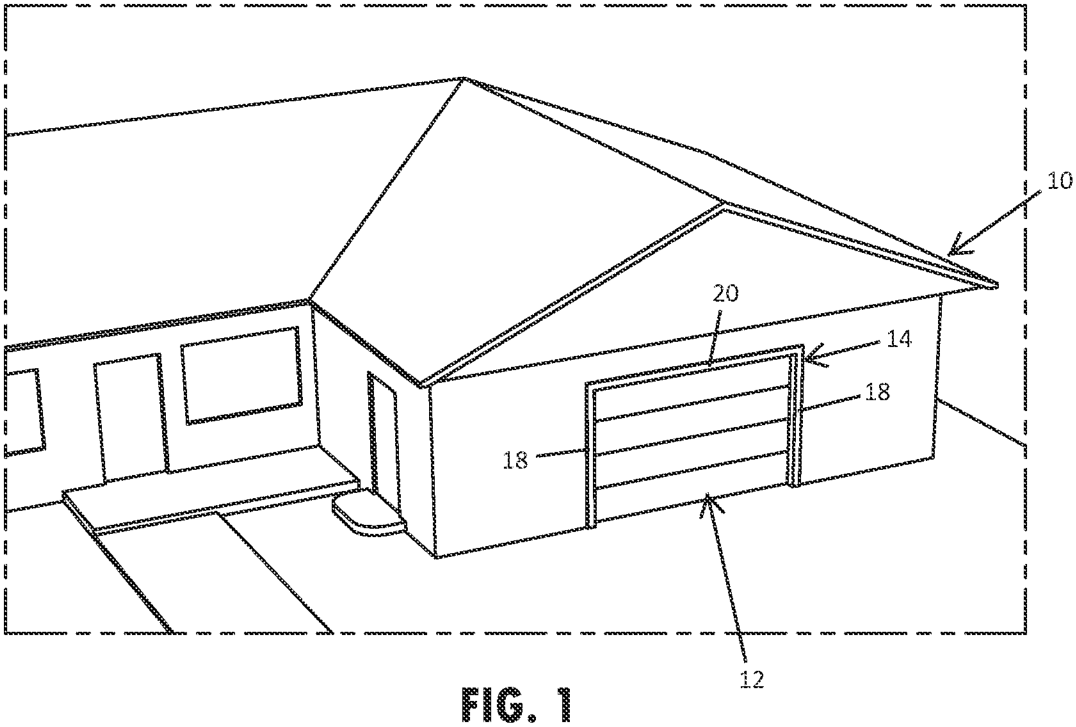
FIG. 1 is a perspective view of a garage having a garage door.

Referring now to the drawings and the illustrative embodiments depicted therein, a garage door sealing system and a magnetic seal for a garage door 12 is provided that operates to form a seal at the edges of the door 12 against the door frame 14 in the closed position. The seal is formed or engaged when the door 12 is in the closed position and is released or disengaged when the door 12 is moved or prompted to open. The seal is formed with magnetic engagement that prevents the sealed garage door 12 from moving away from the door frame 14, which can occur in windy outdoor conditions or in pressure changes from other doors being opened and closed. The release or disengagement of the seal may be done by reversing or eliminating the magnetic field that attracts the door 12 in the closed position. In some examples, a motorized garage door opener and associated system operates to move the garage door between the open and closed positions, such that a signal may be transmitted from the motorized garage door opener and associated system to release or disengage the magnetic seal.

Figure 2:
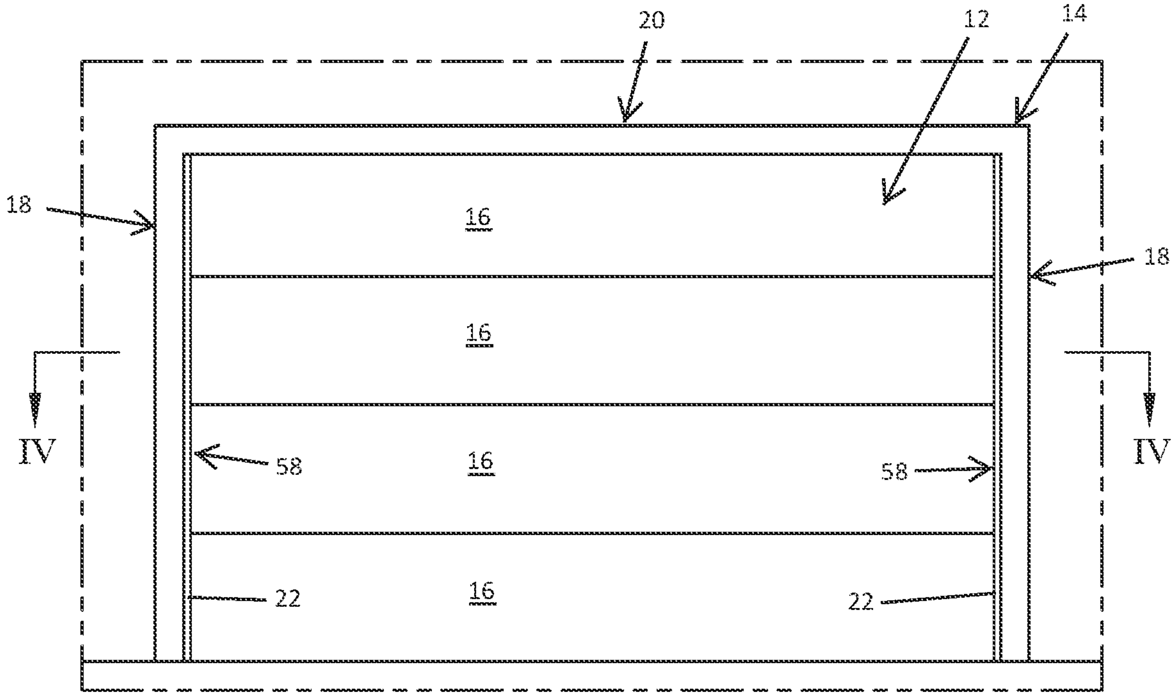
FIG. 2 is an elevation view of the garage with the garage door in a closed position.

As shown in FIGS. 1 and 2, a garage 10 is attached to a residential home and has an overhead garage door 12 situated in a garage door opening defined by a door frame 14. The panels 16 of the garage door 12 are pivotally interconnected to each other and may be referred to as a jointed panel door. The garage door 12 shown in FIGS. 1-3 has four panels, although additional examples may have more or fewer panels that form the door. The panels 16 are rectangular shaped and span horizontally across the door opening defined by the door frame 14. The garage door frame 14 extends upward on opposing sides of a ground surface, such as a concrete slab, brick paver, or asphalt layer, that passes through the door opening. The door frame 14 includes vertically extending side jambs 18 at lateral sides of the door opening and a horizontally extending header 20 that interconnects between the side jambs 18, forming a rectangular shaped door opening. As shown in FIG. 2 at the exterior side of the garage door 12, a trim piece 22 is attached along the side jambs 18 to seal against the door 12 in the closed position. The garage door provided with the system and magnetic seal may also or alternatively include other shapes and types of doors, such as swinging doors and other panel-type doors, such as a single panel overhead door, a slatted or tambour-style door, or roller doors. Further, in additional examples, the system and magnetic seal disclosed herein may be used with various enclosed structures, such as detached garages, barns, sheds, warehouses, hangers, and other accessory buildings.

Figure 3:
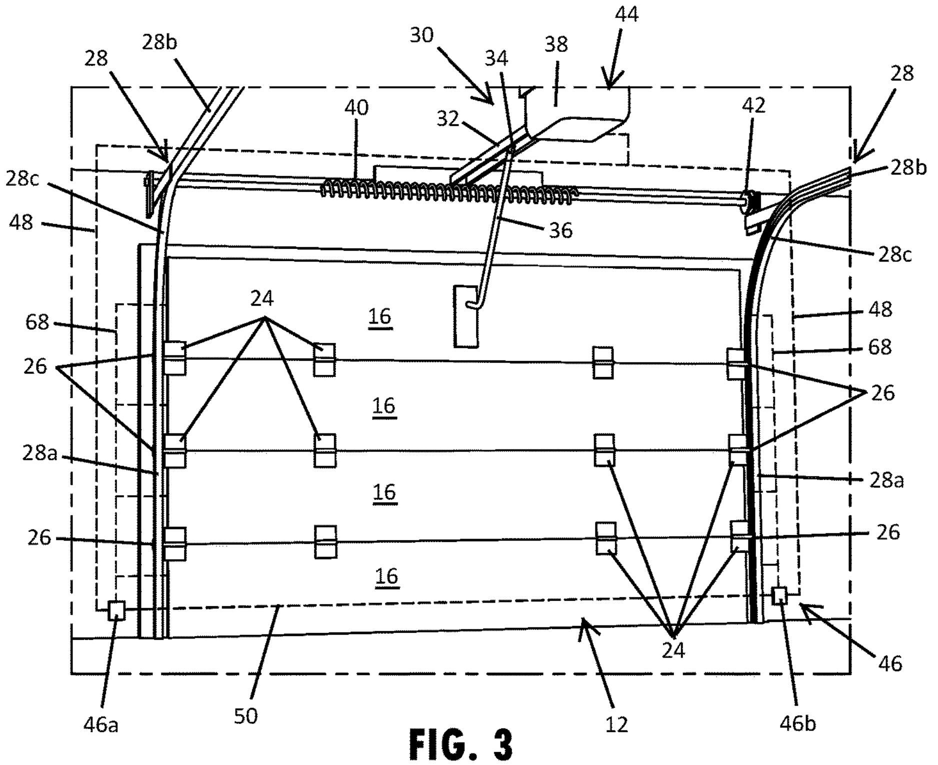
FIG. 3 is a perspective view of an interior side of the garage door shown in FIG. 2.
Figure 5A:
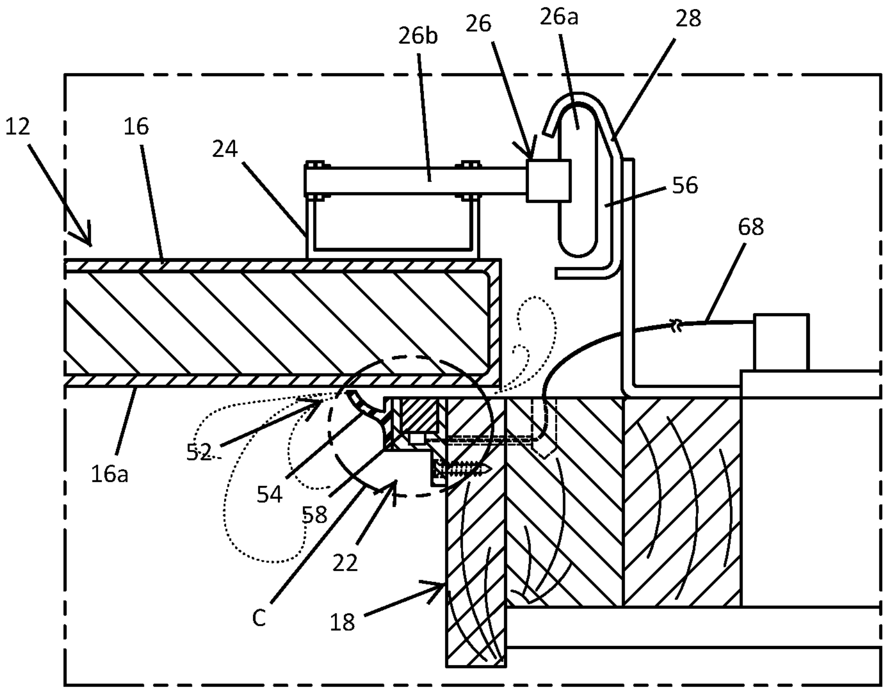
FIG. 5A is a cross-sectional view of the garage door and garage door frame taken at section VA shown in FIG. 4.

As shown in FIG. 3, the garage door 12 has hinges 24 that connect between the panels 16 to provide the pivotal interconnection of the panels 16. The hinges 24 are attached at the interior surface of the panels 16 and arranged at both the outer edges of the panels 16 and at the central area of the panels 16. The garage door 12 shown in FIG. 3 has four hinges 24 secured between each panel 16 with two hinges 24 at the outer edges of the panels 16 and two hinges 24 arranged at the central area of the panels 16. The garage door 12 also has rollers 26 attached at the lateral edges of the panels 16 that are movably engaged with tracks 28 extending along lateral sides of the door opening. Specifically, the rollers 26 includes a wheel portion 26*a* that rolls along an interior channel 56 of the track 28 (FIG. 5A). The rollers 26 show in FIG. 3 are attached to and supported by the hinges 24 provided at the outer edges of the panels 16. To provide the attachment, a spindle portion 26*b* of the rollers attach at the hinges 24, such as shown in FIG. 5A. Other examples of the garage door may include more or fewer hinges and may have the rollers separate from the hinges.

Figure 4:
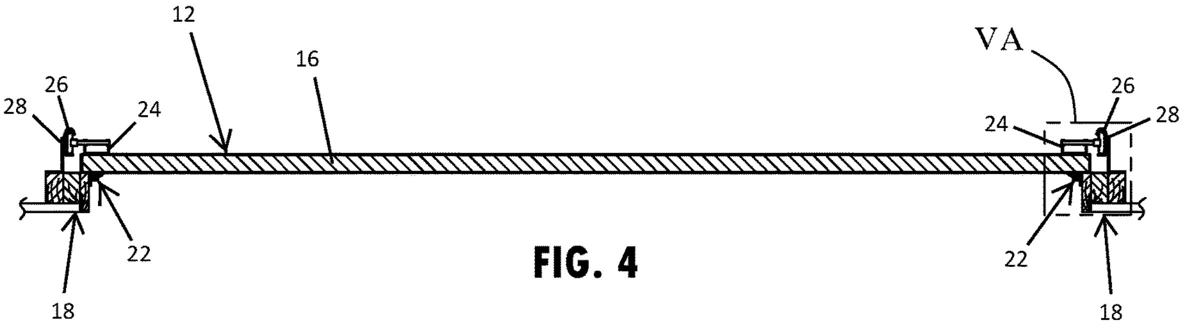
FIG. 4 is a cross-sectional view of the garage door and garage door frame taken at line IV-IV in FIG. 2.

As shown in FIGS. 3 and 4, the tracks 28 are provided at each lateral side of the garage door 12 and each track 28 has a vertical section 28*a*, a horizontal section 28*b*, and a curved section 28*c* that continuously connects the upper end of the vertical section 28*a* with the horizontal section 28*b*. The vertical sections 28*a* of the track 28 extend vertically upward from the ground surface along and in alignment with the side jamb 18 of the door frame 14. The upper end of each vertical section 28*a* transitions to the curved section 28*c* at a location above the uppermost roller 26 with the door 12 in the closed position, such that all of the rollers 26 are situated in the vertical section 28*a* of the track when the door 12 is in the closed position, such as shown in FIG. 3. Similarly, when the garage door 12 is in the open position, the rollers 26 are situated in the curved and horizontal sections of the track 28. In additional examples, the curved section of the track may instead transition to a non-horizontal section of track.

As further shown in FIG. 3, a motorized opener 30 is coupled with the garage door 12 and is configured to move the garage door 12 along the tracks 28 between the open and closed positions in the garage door opening. The motorized opener 30 has a trolley track 32 that attaches to the header wall at the interior of the garage above the header 20 and extends centrally between and in parallel alignment with the horizontal sections 28*b* of the tracks 28. A trolley 34 is movably attached to the trolley track 32 and has an arm 36 that attaches to the garage door 12, shown attached to the interior surface of the upper panel 16 with the door 12 in the closed position. The motorized opener 30 also includes an electric motor 38 that operably engages the trolley, such as with a chain, a belt, a screw-drive connection, or other type of connection used with garage door openers. To move the door 12 along the tracks 28 to the open position, the motorized opener 30 operates by driving the electric motor 38 to move the trolley 34 along the trolley track 32 away from the header 20, which causes the arm 36 to pull the panels upward and rearward along the tracks 32. To assist the garage door opener, the garage door may also include a counterbalance system, such as a torsional spring 40 that mounts on the header wall above the garage door opening and has cables run from the roller brackets at the bottom corners of the door to the cable drums 42. When the door is raised, the spring 40 unwinds and the stored tension lifts the door 12 by turning the cable drums 42, wrapping the cables around the cable drums and lifting the door 12.

The motorized opener 30 may include a controller 44 (i.e., a computing device with local resources, such as data processing hardware and memory hardware) for controlling operation of the electric motor 38 and thereby controlling movement of the garage door. The controller 44 of the motorized opener 30 may include various optional inputs and supportive operational systems. As shown in FIG. 3, a sensor 46 for monitoring the door opening communicates sensor data over a wire 48 to the controller 44 of the motorized opener 30. The sensor 46 is secured at a lower portion of the side jamb 18 at each lateral side of the door opening. The sensor 46 may be a break-beam sensor, such as an infrared sensor, having a transmitter 46*a* attached at one side of the door opening and a receiver 46*b* attached at the other side of the door opening that receives a light beam 50 transmitted by the transmitter 46*a*. The controller 44 therefore may perform sensor processing to monitor the sensor data to provide inputs or feedback to the functionality of the motorized opener 30. For example, when the motorized opener 30 is commanded to close the garage door (e.g., in response to a command from a user via a button, remote, or cellular device), the controller may send a signal to the transmitter 46*a* and the receiver 46*b* and monitor the signal during the closing process. If the sensor signal is interrupted (e.g., by an object interrupting the light beam transmitted from the transmitter to the receiver), the controller 44 may then stop and/or reverse movement of the garage door to prevent the garage door from contacting the sensed object. Once in the garage door is in the closed position, the controller may stop sending the signal to the transmitter and receiver.

Figure 5B:
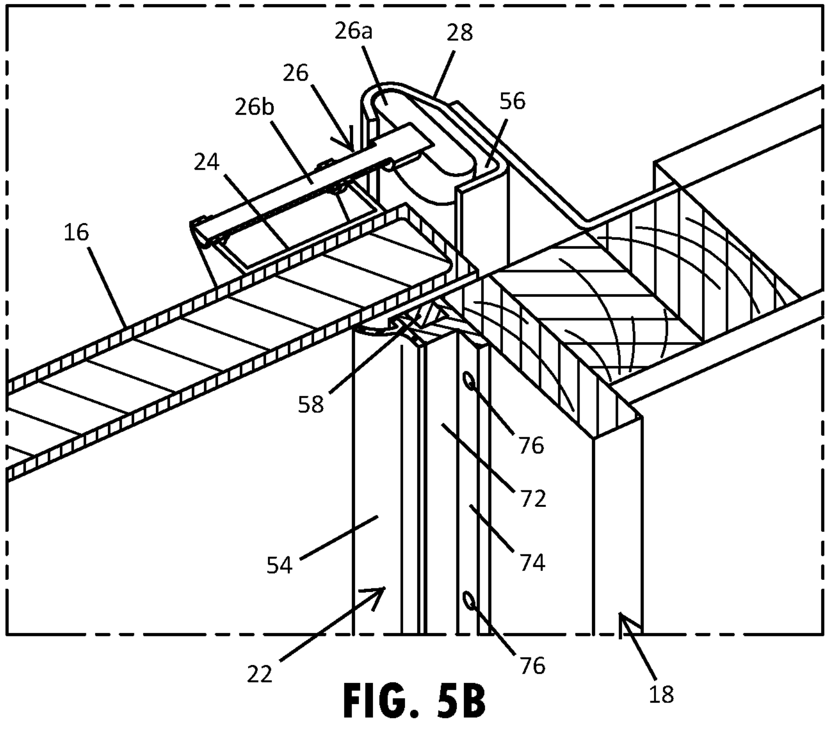
FIG. 5B is a perspective cross-sectional view of the garage door and garage door frame of FIG. 5A.

Referring now to FIGS. 5A and 5B, the outer edge of the garage door 12 is shown having a gap 52 between the panel 16 and the side jamb 18 of the door frame. The trim piece 22 is attached at the interior edge of the side jamb 18, such that a weather strip portion 54 of the trim piece 22 extends toward the exterior surface 16*a* of the panel 16 of the garage door 12 to assist with preventing the gap 52. However, in some instances, the gap 52 may still exist with the door 12 in the closed position without any external forces acting on the door 12 and may also exist or expand when external forces act on the door 12, such as windy outdoor conditions (e.g., with wind gusts forcing the garage door inward) or in pressure changes, such as from internal air movement, temperature differences, or other doors being opened and closed. For example, as shown in FIGS. 5A and 5B, the roller 26 may be situated rearward in the interior channel 56 of the track 28, such as due to external forces acting on the door 12, to form the gap 52. As illustrated in FIG. 5A, the gap 52 can allow interior air to escape the garage and/or exterior air to enter the garage, either of which can allow for undesirable heat loss/transfer that can greatly stress the heating or cooling system of the enclosed garage. Also, the gap 52 can make the garage susceptible to insects, water intrusion, and potential safety compromises.

To close the gap 52 and provide a seal along the outer edge of the garage door 12, a magnet 58 is disposed at opposing lateral sides of the door frame. The magnets 58 are configured to magnetically engage the garage door 12 in the closed position and to release magnetic engagement with the garage door 12 in response to a signal from the controller 44 for the garage door 12 to move to the open position. When the door 12 is in the closed position, the magnets 58 are magnetically attracted to the edge of the door 12, which draws the door 12 into sealed engagement with the door frame, substantially eliminating the gap 52. The magnets 58 may be a single strip that extends along the lateral sides of the door frame or may be individual magnets arranged at each panel, such as shown in FIG. 3 with a four separate magnets along each side jamb of the door frame, each situated at a central area of a corresponding panel. For example, the individual magnets may be 1 inch wide and 5 inches in height. In other examples the individual magnets may be various sizes and arranged differently along the edges of the door.

Figure 5C:
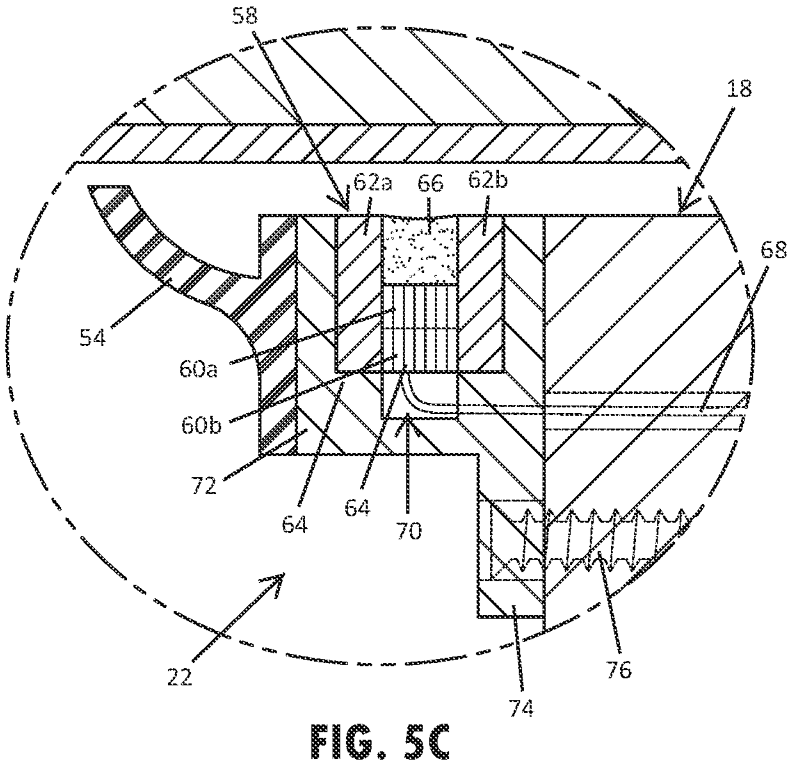
FIG. 5C is a cross-sectional view of enlarged section C shown in FIG. 5A.

The magnets 58 may include electromagnets, such as an electro-permanent magnet as shown for example in FIG. 5C. The electro-permanent magnet shown in FIG. 5C includes a pair of permanent magnets 60*a*, 60*b* (i.e., hard or semi-hard magnetic materials) that are arranged parallel to each other with ends of the permanent magnets 60*a*, 60*b* magnetically coupled with metal pole pieces 62*a*, 62*b* that extend toward the garage door 12. The permanent magnets 60*a*, 60*b* are wrapped with a coil 64, such as shown in FIG. 5C. In additional examples, the electro-permanent magnet may be arranged differently from the example shown in FIG. 5C, such as with a different coil winding location or permanent magnet arrangement, and provide the same or similar function.

As shown in FIG. 5C, the permanent magnets 60*a*, 60*b* of the electro-permanent magnet may be two magnetic materials, such as one permanent magnet 60*a* being magnetically hard (e.g., NdFeB) and the other permanent magnet 60*b* being semi-hard (e.g., Alnico). The permanent magnets 60*a*, 60*b* are capped at both ends with the pole pieces 62*a*, 62*b*, which may be a magnetically soft material (e.g., Iron). The coil 64 wrappings extend around both of the permanent magnets 60*a*, 60*b* in a plane generally parallel to the planar extent of the pole pieces 62*a*, 62*b*, which are shown as plate-shaped strips of metal that extend vertically along the side jambs 18 of the door frame. To prevent tampering or deterioration to the permanent magnets 60*a*, 60*b* and coil 64, a non-magnetic filler material 66, such as a silicon or epoxy, may be disposed in the channel formed between the pole pieces 62*a*, 62*b*. With such an arrangement, the electro-permanent magnet 58 emits a magnetic field toward the garage door 12 without requiring electrical power to maintain the field. A current pulse to the coil 64 is only required to change the device's state, namely, providing an opposite polarity to reverse the magnetization of the semi-hard material, while leaving the hard material unchanged. This reverse magnetization in one of the permanent magnets 60*b* diverts some or all of the flux of the other permanent magnet 60*a* to circulate inside the electro-permanent magnet (i.e., circulating between the permanent magnets through the pole pieces 62*a*, 62*b*), which reduces or eliminates the external magnetic field or flux provided by the electro-permanent magnet toward the garage door 12.

The electro-permanent magnets, thus, operate to switch between an ON state (i.e., a state of external magnetic flux not requiring electric current) and an OFF state (i.e., a state of reverse polarity in one of the permanent magnets that reduces or eliminates the external magnetic flux) in response to a pulse of electrical current. The system may provide such an electrical current to the electro-permanent magnet in various ways to provide the desired operation. For example, the controller 44 of the motorized opener 30 may transmit the pulse of electrical current to switch the electro-permanent magnets 58 to the OFF state. For instance, as shown in FIG. 3, the coil 64 of the electro-permanent magnets may be connected with a wire 68 that connects to the wire 48 (e.g., via the sensor 46), such that the controller 44 may transmit a pulse of electrical current over the wire 48 to the magnets to operate electro-permanent magnets between the ON and OFF states. For example, the signal sent from the controller 44 to the sensor 46 that is monitored when the garage door 12 is closed (and opened) may also be used to operate the electro-permanent magnets between the ON and OFF states. More specifically, when the signal is sent, the electro-permanent magnets are caused to be switched to the OFF state to allow movement of the garage door 12 without any or substantially any interference by the magnetic field of the electro-permanent magnet. Likewise, when the signal is no longer sent by the controller 44, the electro-permanent magnet is switched back to the ON state to magnetically couple with the garage door 12 and form a seal between the garage door and the door frame, such as shown in FIGS. 6A and 6B.

To operate in situations where the garage door opener is inoperable (e.g., during a power outage) or when the garage does not have access electricity, the system may include an override switch connected to the electro-permanent magnets, such as an override switch connected to the wire 68 that leads to the coil 64. The override switch may include a battery, such as one or more 9 V batteries, that transmit the pulse of electrical current that is used to switch the electro-permanent magnets to the OFF state.

Figure 6A:
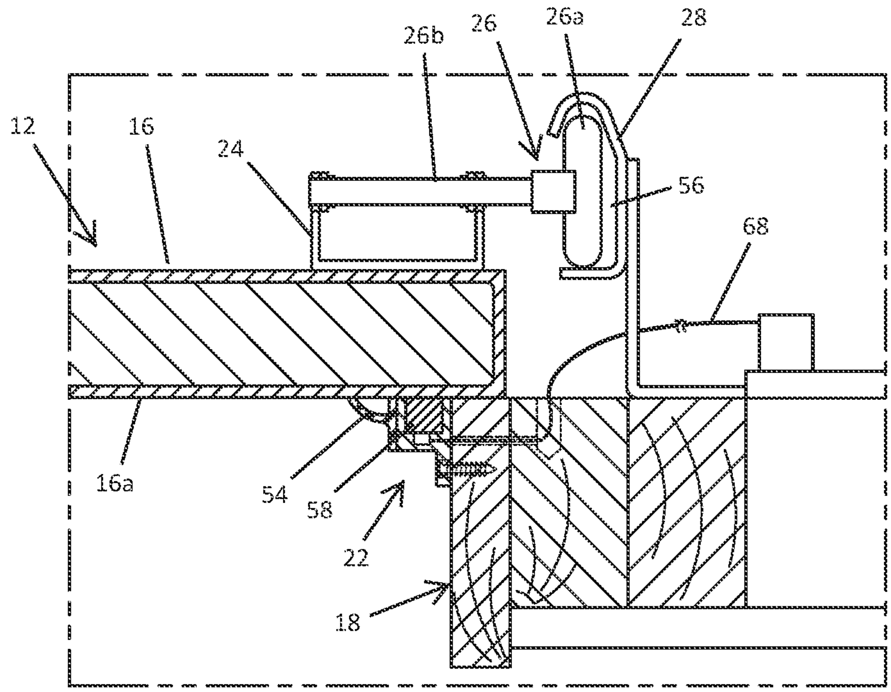
FIG. 6A is a cross-sectional view of the garage door magnetically engaged to the garage door.
Figure 6B:
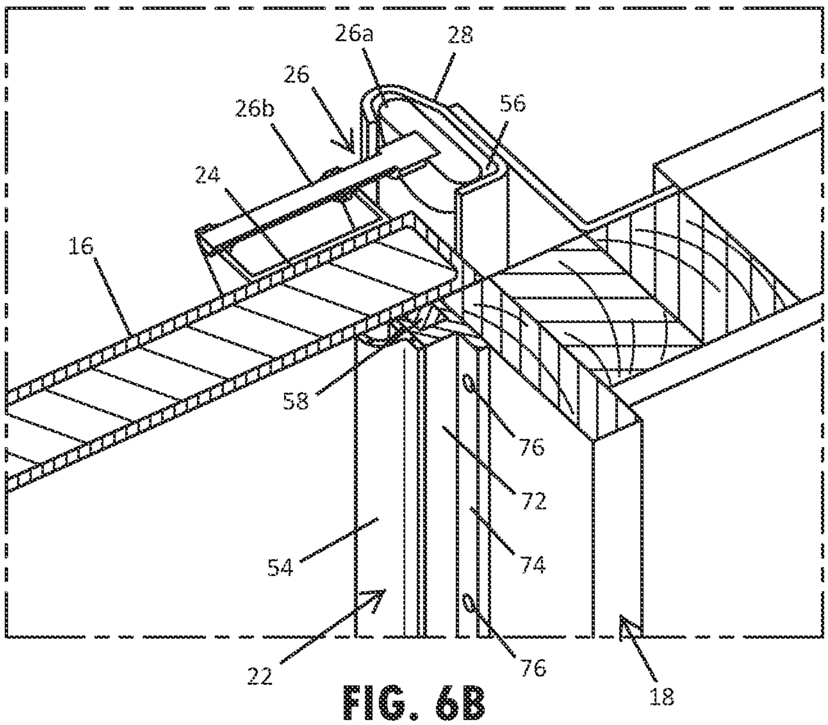
FIG. 6B is a perspective view of the garage door and garage door frame of FIG. 6A.
Figure 7:
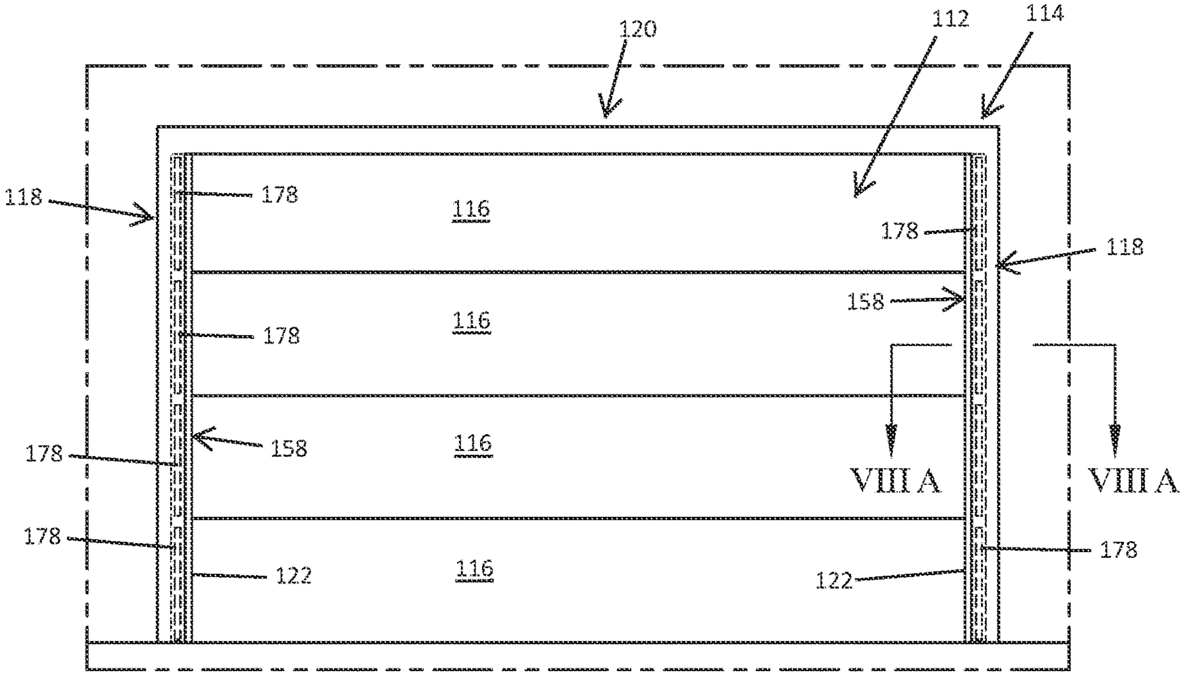
FIG. 7 is an elevation view of another example of a garage with a garage door in a closed position.
Figure 8A:
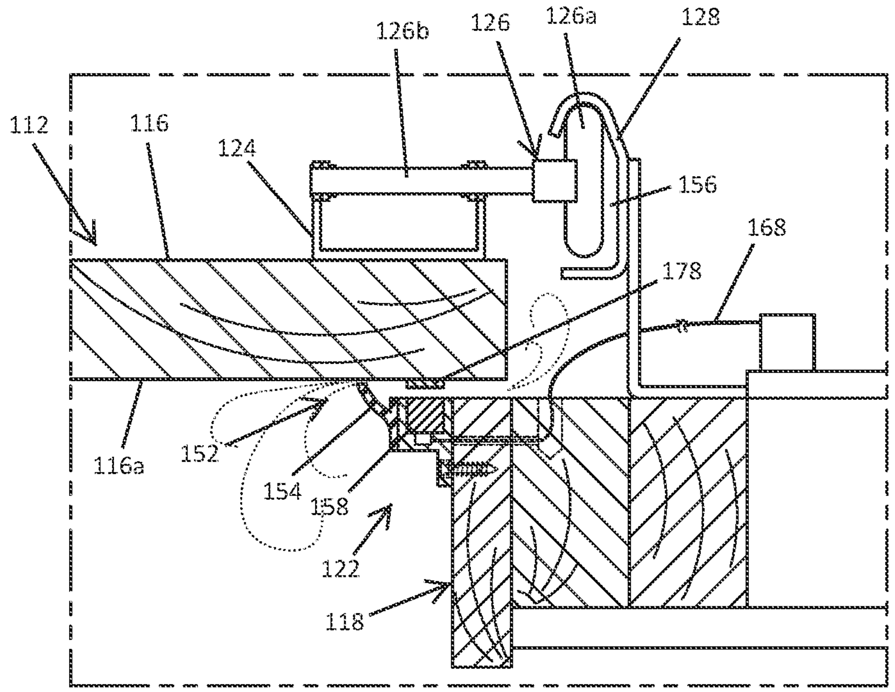
FIG. 8A is a cross-sectional view of the garage door and garage door frame taken at line VIIIA-VIIIA shown in FIG. 7.
Figure 8B:
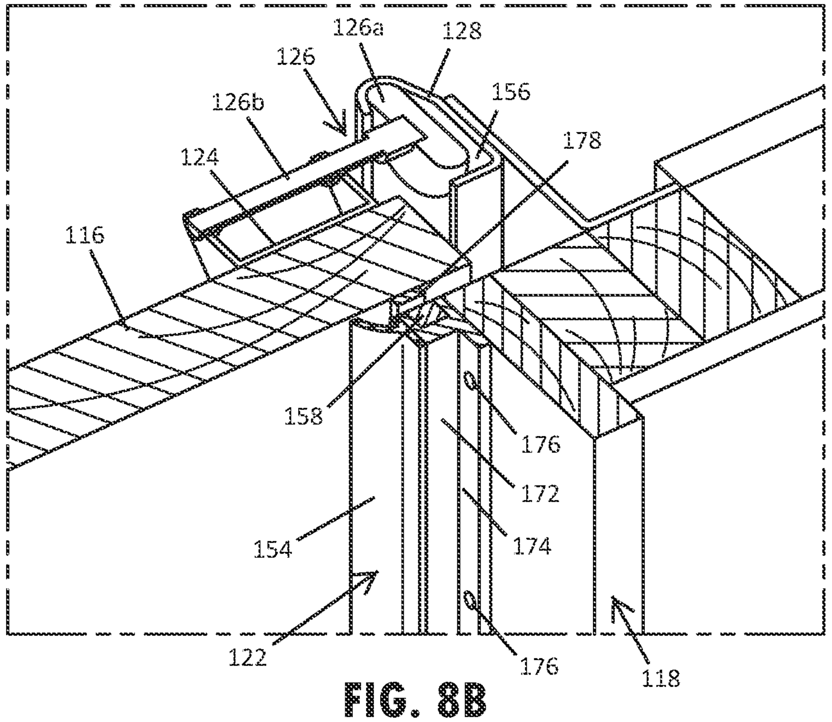
FIG. 8B is a perspective cross-sectional view of the garage door and garage door frame of FIG. 8A.
Figure 9A:
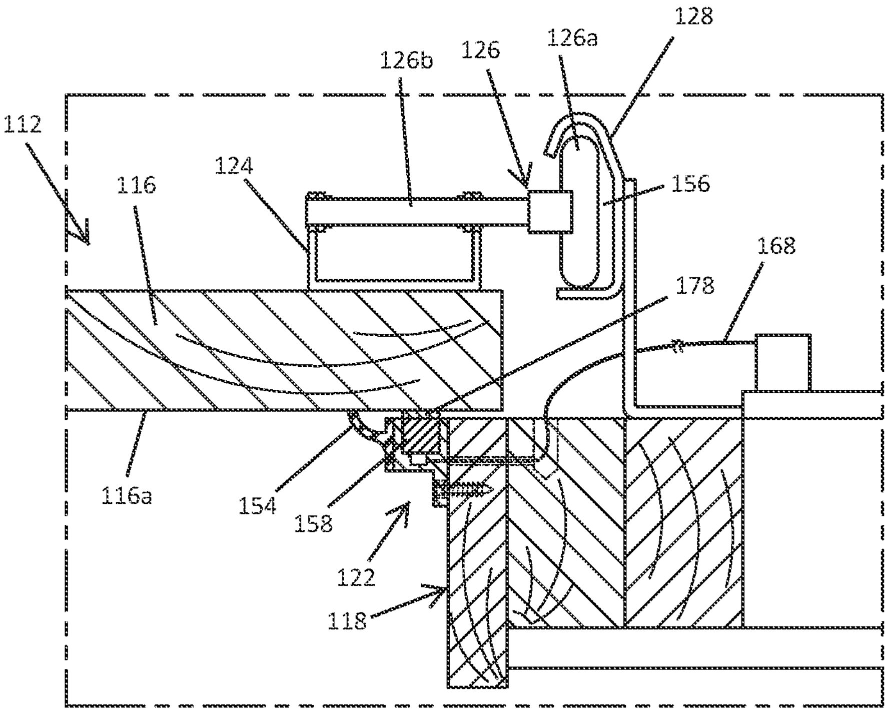
FIG. 9A is a cross-sectional view of the garage door of FIG. 7 magnetically engaged to the garage door.
Figure 9B:
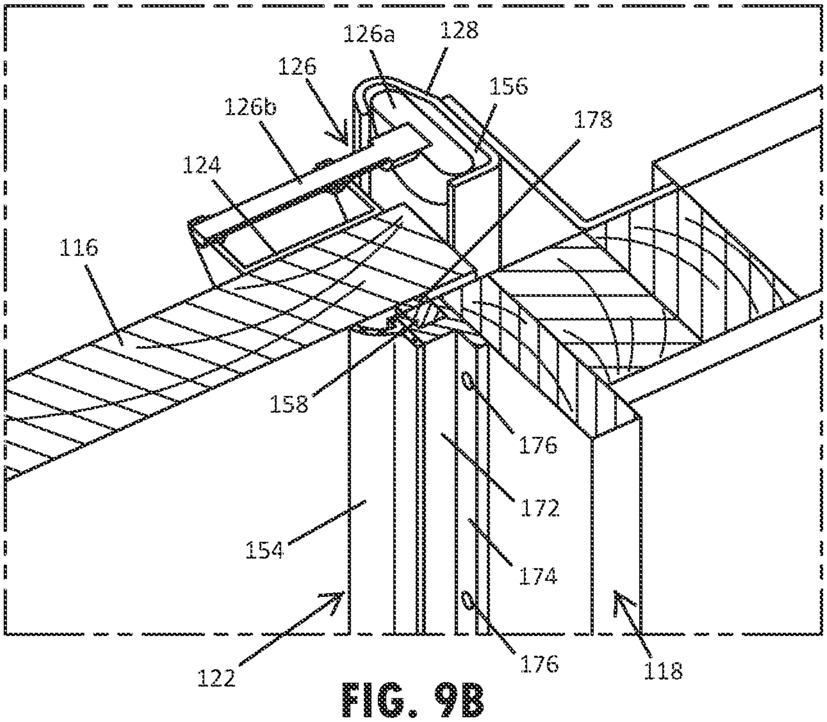
FIG. 9B is a perspective cross-sectional view of the garage door and garage door frame of FIG. 9A.

As also shown in FIGS. 6A and 6B, the natural magnetic field with the electro-permanent magnet in the ON state draws the panel 16 toward and against the magnet and the adjacent door frame. This movement of the panel 16 is permitted by the interior channel 56 of the track 28 having an interior width that is greater than a diameter of the wheel 26*a* of the rollers 26 sufficiently to allow the rollers 26 to move toward the door frame in the interior channel 56 of the track 28 with the door in the closed position in response to the engagement of the magnets with the door. This interior channel dimension of the track may be generally configured as the tolerance provided in an existing or supplied garage door track or may be provided by replacing or altering the existing or supplied track (e.g., by bending the track channel open at the roller locations in the closed position).

Further, in alternative examples, the magnet may include an electromagnet without a permanent magnet (e.g., a "fail safe" electric locking device), such that the electromagnet generates a magnetic flux when current passes through the electromagnet. The electromagnet in such an arrangement may include a battery backup that is capable to maintain the magnetic flux when power is temporarily lost. Also, in some implementations, the magnet may include an electromagnet that is referred to as a "fail secure" electric locking device.

Referring again to the example illustrated in FIG. 5C, the trim piece 22 has a channel 70 along the trim piece 22, where the magnet 58 is disposed in and concealed in the channel 70. In addition to concealing the magnet 58, the trim piece 22 may conceal the opposing lateral edges of the panels 16 of the garage door 12. As shown in FIG. 5C, the body 72 of the trim piece forms a U-shape with the channel 70 creating the interior of the U-shape. A portion of the U-shape may also be used to contain the wire 68, which may pass through a hole formed in the door frame. Also, the body 72 of the trim piece 22 has a flange 74 that is configured to attach to the door frame, shown as the side jamb 18. The trim piece 22 may be attached to the door frame in various ways, such as with fasteners, adhesive, tape, or combinations thereof. For example, as shown in the FIGS. 5B and 5C, fasteners 76 extends through the flange 74 to secure the trim piece 22 to the side jamb 18.

The trim piece 22 that conceals the magnet 58 may also integrate a weather strip to enhance the seal against the garage door when the magnet 58 is magnetically coupled with the door in the closed position. For example, as shown in FIG. 5C, the weather strip portion 54 extends from a face of the body 72 of the trim piece 22 that opposes the flange 74. The weather strip portion 54 is configured to contact the exterior surface 16*a* of the garage door closed in the door opening. The weather strip portion 54 may include a flexible polymer (i.e., an elastomer), such as rubber or the like, to allow the weather strip portion 54 to flex and bias against the exterior surface 16*a* of the panel 16 of the garage door in the closed position and the electro-permanent magnet in the ON state (i.e., with the naturally occurring magnetic field of the permanent magnets coupled to the garage door), such as shown in FIGS. 6A and 6B. More specifically, the panel 16 is drawn and moved toward the side jamb 18 of the door frame by the magnetic flux generated by the electro-permanent magnet a distance sufficient for the gap 52 (shown in FIG. 5A) to be closed by the panel 16 abutting the weather strip portion 54, the trim piece 22, and/or the side jamb 18.

To form the magnetic coupling with the edge portion of the panels 16 of the garage door 12, the panels of the garage door are formed from a ferromagenetic metal, such as stamped steel. For example, as shown in FIGS. 6A and 6B, the panel 16 of the garage door 12 has outer stampings that are formed of with galvanized steel and painted with a powder-coating. The outer stampings surround a hollow interior that is filled with an insulating material, such as a fiberglass or styrene material or the like.

In some examples, such as when the panels of the garage door are not formed from a ferromagnetic metal, such as wood or fiberglass, a metal strip may be attached at opposing lateral edges of the panels of the garage door. Referring now to FIGS. 7-9B, the garage door 112 has panels 116 formed from solid wood panels and include metal strips 178 attached vertically along the lateral edges of the panels 116. The metal strips 178 may be attached to the exterior surface 116*a* of the panels 116 in various ways, such as with fasteners (e.g., screws, nails, staples, etc.), adhesive, and/or tape. Also, in additional examples, the metal strips may be recessed in or concealed within the panel. Other features of the system and magnetic garage door seal and associated components shown in FIGS. 7-9B are similar to system and components described above and shown in FIGS. 1-6B, such that they are not described in detail again, and similar reference numbers are used, incremented by 100.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

Also for purposes of this disclosure, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system comprising:

a garage door having a plurality of panels pivotally interconnected and spanning horizontally across a door opening defined by a door frame, the plurality of panels having rollers movably engaged with tracks extending along lateral sides of the door frame;

a motorized opener coupled with the garage door and configured to move the garage door along the tracks between an open position and a closed position, the motorized opener having a controller for controlling the movement of the garage door; and magnets disposed adjacent the lateral sides of the door frame, the magnets configured to magnetically engage the garage door in the closed position, and the magnets configured to release the magnetic engagement with the garage door in response to a signal from the controller when the garage door is to be moved from the closed position to the open position; and wherein the magnets each comprise an electro-permanent magnet that has a coil wrapped around the electro-permanent magnet and pole pieces disposed at ends of the electro-permanent magnet.

2. The system of claim 1, wherein the pole pieces comprise a magnetically soft material.

3. The system of claim 2, wherein the electro-permanent magnets are configured to switch between an ON state and an OFF state in response to a pulse of electrical current.

4. The system of claim 3, wherein the controller of the motorized opener transmits the pulse of electrical current to switch the electro-permanent magnets to the OFF state.

5. The system of claim 3, wherein the electro-permanent magnets generate a magnetic field in the ON state that is configured to magnetically engage the garage door in the closed position and form a seal between the garage door and the door frame.

6. The system of claim 1, further comprising a sensor disposed at a lower portion of one of the lateral sides of the door frame, wherein the sensor communicates with the controller of the motorized opener over a wire, and wherein the controller transmits a pulse of electrical current over the wire to the magnets to release the magnetic engagement with the garage door.

7. The system of claim 1, wherein each of the lateral sides of the door frame includes a weather strip, wherein when the garage door is in the closed position and the magnets are magnetically engaged with the garage door, the weather strip contacts strips contact the garage door to form a seal.

8. The system of claim 1, further comprising trim pieces disposed adjacent the lateral sides of the door frame, the trim pieces each having a channel, and the magnets disposed in the channels.

9. The system of claim 1, wherein the tracks have an interior width that is greater than a diameter of the rollers to allow the rollers to move laterally in the interior width of the tracks with the garage door in the closed position in response to the magnetic engagement of the magnets with the door.

10. The system of claim 1, wherein the plurality of panels of the garage door each comprise a ferromagnetic metal.

11. The system of claim 1, further comprising metal strips attached to opposing lateral edges of the plurality of panels of the garage door, the metal strips comprising a ferromagnetic metal alloy.

12. A magnetic smart seal for an overhead garage door, the magnetic smart seal comprising:

a trim piece having a U-shaped body defining a channel, the body of the trim piece having a flange configured to attach to a frame surrounding a door opening for the overhead garage door;

a seal extending from a portion of the body of the trim piece that opposes the flange, the seal configured to contact the overhead garage door when the garage door is in a closed position; and an electro-permanent magnet disposed in the channel and configured to magnetically engage the overhead garage door in the closed position, wherein the electro-permanent magnet is wrapped with a coil, and wherein the electro-permanent magnet is capped at both ends with pole pieces, the pole pieces comprising a magnetically soft material.

13. The magnetic smart seal of claim 12, wherein the electro-permanent magnet is configured to switch between an ON state and an OFF state in response to a pulse of electrical current.

14. The magnetic smart seal of claim 12, wherein the electro-permanent magnet comprises two electro-permanent magnets, and wherein one of the two electro-permanent magnets is magnetically hard and the other of the two electro-permanent magnets is magnetically semi-hard.

15. The magnetic smart seal of claim 12, wherein the coil extends around the electro-permanent magnet in a plane generally parallel to a planar extent of at least one of the pole pieces.

16. The magnetic smart seal of claim 12, wherein the seal is configured to bias against the overhead garage door when the electro-permanent magnet is magnetically engaged with the overhead garage door in the closed position.

17. The magnetic smart seal of claim 16, wherein the portion of the body of the trim piece comprises a face of the body of the trim piece.

18. The magnetic smart seal of claim 16, wherein the seal comprises a flexible polymer configured to allow the seal to flex.

19. A magnetic smart seal for an overhead garage door, the magnetic smart seal comprising:

a trim piece having a body that includes a channel extending along a length of the trim piece, the body including an interface surface disposed along one side of the channel and configured to attach to a frame surrounding a door opening that the overhead garage door overlies in a closed position thereof;

a seal extending from the body of the trim piece opposite the interface surface, wherein the seal is configured to contact the overhead garage door in the closed position; and an electro-permanent magnet disposed in the channel and configured to operably engage the garage door via magnetic coupling and disengage the garage door, wherein the electro-permanent magnet comprises a permanent magnet that is wrapped with a coil that is configured to carry an electrical current that operates the electro-permanent magnet.

20. The magnetic smart seal of claim 19, wherein the electro-permanent magnet comprises pole pieces extending from ends of the permanent magnet, wherein the pole pieces are configured to extend toward the garage door in the closed position.

* * * * *